SELF-PROGRAMMED SERIAL TO PARALLEL CONVERTER

Filed Oct. 17, 1963

INVENTOR.
PAUL G. LUCAS
BY Fenny, Jenney & Hildreth
ATTORNEYS

3,355,732
SELF-PROGRAMMED SERIAL TO PARALLEL CONVERTER

Paul G. Lucas, Magnolia, Mass., assignor to Adage, Inc., Cambridge, Mass., a corporation of Massachusetts Filed Oct. 17, 1963, Ser. No. 316,808
6 Claims. (Cl. 340—347)

Figure 2:
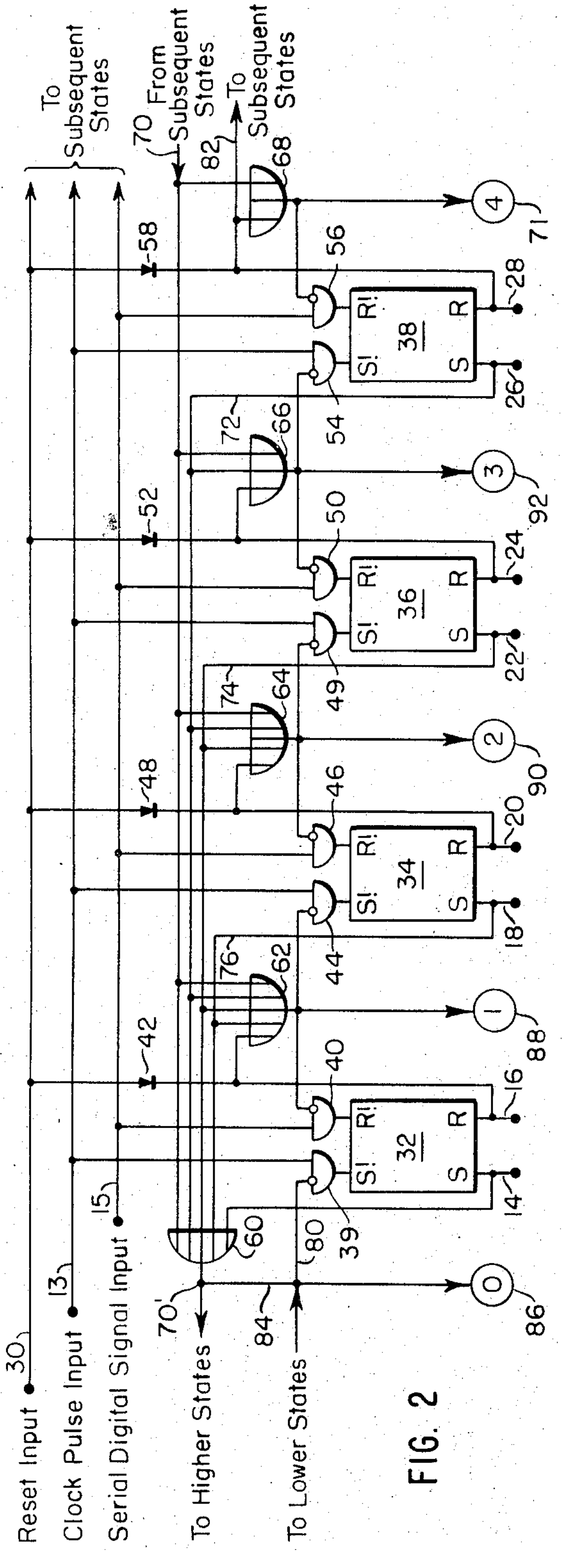

My invention relates to a device for converting a series of pulses spaced in time which represent information in digital form to a set of concurrently appearing voltage levels. Such devices are known in the digital computer art as serial to parallel converters. More particularly, my invention relates to a novel self-programmed serial to parallel converter.

Serial to parallel converters are known devices in the digital computer art. In many applications a digital signal will appear, in binary fashion, as a pulse train with some pulses omitted at the time they would normally appear to indicate a "zero" in the digital "word" represented by the pulse train, the presence of a pulse indicating a "one." Thus, assuming a "clock" pulse generator which generates a pulse at periodic intervals, a digital "word" of six binary digits would be represented by the presence or absence of pulses at the times corresponding to six successive clock pulses. Thus, if one wanted to represent the "word" 101100, as serial pulse train, the first pulse in the signal would appear at the same time as a first clock pulse, no pulse (a "zero") would appear at the time of the second clock pulse, then two pulses would appear at the time of the next two clock pulses, and no pulses would be present for the final two clock pulses in the six pulse sequence.

While it is often useful to express a digital word in this form, other applications may require that the entire word be available at one time. For this purpose serial to parallel converters have been developed. In general such converters have heretofore included two separate units or elements. One of these was a set of flip-flops, one for each binary digit. The other major element consisted of controlling logical circuitry for, in effect, putting each of the set of flip-flops in condition to be operated by the serial pulses of the signal pulse train. The clock pulses were fed to the controlling logical circuitry so that one of a set of output leads was selected at a time in sequence, a new selection being made each time a clock pulse was received. The signal on the selected lead (or leads) usually opened a gate to one flip-flop of the set of flip-flops, and this was then switched if a pulse was received on the signal input lead (which might represent a "1") or left in its initial state (which might represent a "0"). In this fashion each of the flip-flops in the set was placed in a state to represent one of the digits of the digital "word" supplied on the signal lead. For example, the "word" 101100 might be translated by a serial to parallel converter so that the first flip-flop of the set in the converter would be in the "1" state, the second in the "0" state etc. Since the flip-flops retain their setting after being set, when the entire conversion is complete the digit is completely represented and available at one time i.e. concurrently as the signals appearing on the flip-flop outputs.

The controlling logical circuitry has, in such converters, consisted in general of a second set of flip-flops connected as a ring counter or, in some cases, of a delay line. In either case, complex and expensive circuitry was required in connection with the counter or delay line to program the output set of flip-flops.

I have found that an improved serial to parallel converter may be made by making the output set of flip-flops self-programming and in effect doing away wtih the major components of the controlling logical circuitry. This can be done by implementing a logical scheme in which each flip-flop of the set is conditioned for reception of a digit of the serial pulse train when the flip-flop next preceding it in the set is activated and when all flip-flops in the set following it in sequence have not been set to other than their initial state. The self-programmed serial to parallel converter of my invention differs from ring counters, stepping registers etc., in that once a flip-flop is conditioned for reception of a digit, it will remain conditioned, regardless of the state the flip-flop preceding it may assume in response to the signal it receives from the pulse train.

It will thus be seen that a principal object of my invention is to provide an improved serial to parallel converter for digital signals. Another object of my invention is to provide a self-programming converter of the type described which obviates the need for the major elements of the controlling logical circuitry which have heretofore been required. A further object of my invention is to provide a serial to parallel converter of the type described which can readily be constructed in modular form, and a converter of an appropriate number of digits obtained by simple interconnection of the modules. A still further object of my invention is to provide a converter of the type described which also provides an indication of the state of the conversion process. Still another object of my invention is to provide an improved serial to parallel converter that is simple and economical of construction, but reliable in operation. Other and further objects of my invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 1:
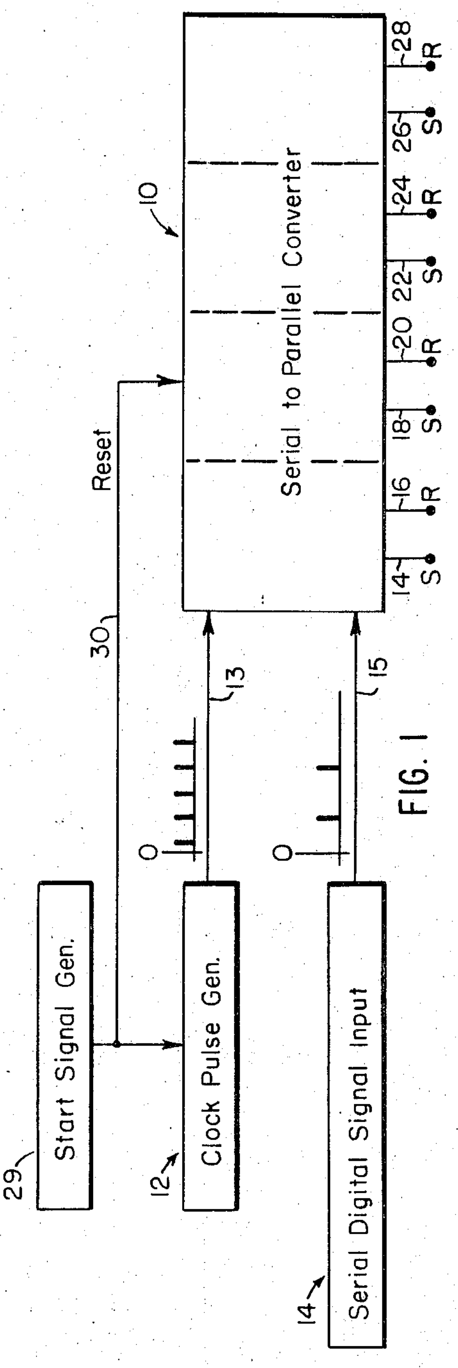

For a fuller understanding of the nature and objects of my invention, reference should be had to the following detailed description taken in connection with the accompanying drawing in which:

FIGURE 1 is a block and line diagram illustrating in general, the environment and operation of a serial to parallel converter of my invention; and FIGURE 2 is a block and line diagram of one module, containing four flip-flops, of a serial to parallel converter made according to my invention.

As shown in FIGURE 1, a serial to parallel converter 10 is supplied with pulses at a steady rate from a clock pulse generator 12 on lead 13. These pulses are known as "clock" pulses. The pulse generator 12 might be the pulse generator used with a computer or like device for example. Additionally, the converter 10 is supplied with a pulse train representative of information which it is desired to represent in parallel form from a serial digital signal generator 14 on lead 15.

For purposes of convenience, in this and the following description I have adopted certain conventions. The occurrence of a pulse in the serial pulse train at a time corresponding to a clock pulse is taken as a "1," while the absence of a pulse in the serial pulse train at the time of a clock pulse is a "0." Further, a flip-flop is assumed to have two states a "set" and a "reset" state. The output leads labeled S and R from each flip-flop have positive and negative voltages on them respectively in the set state, the polarity of these voltages being reversed in the reset state. Finally, when a flip-flop has a "0" stored therein it is in the set state, i.e. the output lead labelled S has a positive polarity voltage on it; if the flop-flop has a "1" stored in it, then the output lead labelled R has a voltage of positive polarity on it. It will be readily understood by those skilled in this art, that these are merely conventions chosen for ease of explanation and that in each case an opposite convention could have been chosen without departing from my invention.

Again referring to FIGURE 1, the serial to parallel converter 10 includes a set of at least four flip-flops, and their output leads are labelled 14, 16, 18, 20, 22, 24, 26 and 28 as shown. Lead 14 is the "set" output lead of the first flip-flop and lead 16 is the "reset" output lead of the same flip-flop. Each of the subsequent pairs of leads is associated with a subsequent flip-flop in a similar manner.

A start signal generator 29 is provided which supplies an appropriate start signal to the clock pulse generator 12. At the same time it supplies a signal to the converter 10 via lead 30 to cause the converter to go to the reset state, i.e. all the output flip-flops are caused to go to the "reset" state to clear the converter at the time of the "start" signal.

In operation the start pulse causes the clock pulse generator to begin operation and thereafter a pulse train is supplied on lead 13 to the converter 10. The first five of these pulses are shown in the waveform associated with lead 13 in FIGURE 1. For purposes of explanation it is assumed that the serial digital signal generator 14 begins generating a digital signal following the first clock pulse and that its first four digits are 1010. This signal is represented by the wavefrom associated with the lead 15 in FIGURE 1.

The first clock pulse received by the converter 10 causes it to condition itself for the reception of the first digit of the serial pulse train at the time of the next clock pulse. Then, the reception of the second clock pulse and the first digit, which is a "1" in this case, causes the first flip-flop to assume a "set" condition, (or remain in it if the first clock pulse caused it to assume this state) and conditions the converter to apply the second digit to the second flip-flop. At the time of reception of the third pulse from the clock, no pulse is received from the pulse train. Thus the second flip-flop is caused to assume the reset state (or allowed to remain in that state) and the third flip-flop is conditioned to receive the third digit.

It will be noted that conditioning of the appropriate flip-flop takes place by the clock pulse next preceding the one coinciding with the digit which is to control the flip-flop state. In the converter of my invention, I cause this conditioning clock pulse to change the flip-flop which is to be controlled by the next digit to be switched from the reset state to the set state. Then the arrival of a pulse in the signal pulse train causes the flip-flop to revert to the reset state, and the absence of a pulse causes it to remain in the set state.

In order to cause the flip-flops to be self-programming, I enable each flip-flop to receive a clock pulse when:

(1) The flip-flop next preceding it is in the set state; and
(2) All succeeding flip-flops in the sequence are in the reset state, as they will be unless one of them has a "0" stored therein or the reset signal has failed to operate.

These two conditions are logically sufficient to insure that each of the pulses are fed in turn to the flip-flops in proper sequence. Further, since the digital signal is steered by the next preceding clock pulse, it is immaterial whether a flip-flop is allowed to remain in the set state or caused to reset by the digital signal. The foregoing discussion will be clearer by reference to FIGURE 2, which as I have indicated, is a block and line diagram of a converter embodying my invention. As shown therein the converter includes a plurality of flip-flops 32, 34, 36 and 38, four being illustrated for purposes of convenience.

I have found that a converter made according to my invention may be conveniently made in modular form and a plurality of modules may then be connected together to form a complete converter. In practice I have found it convenient to include four flip-flops on each module, and a single complete module is illustrated in FIGURE 2. However, it is to be understood that a module might include a lesser or greater number of flip-flops if desired; further, the module concept need not be used at all, as will be apparent from the following description.

A pair of inhibit gates 39 and 40 are associated with the flip-flop 32. These gates normally do not pass a signal supplied on one of their input leads unless the other input lead is supplied with a negative voltage. The output of the gate 39 is supplied to the pulse input terminal S! for the set state of the flip-flop 32. A pulse supplied to the S! terminal of flip-flop 32 causes the flip-flop to assume the set state. Inhibit gate 40 is connected to the pulse input terminal R! for the reset state of the flip-flop 32. A pulse applied to the R! terminal of flip-flop 32 causes the flip-flop to assume the reset state state. While the flip-flops 32, 34, 36 and 38 are normally set by the application of pulses to the S! and R! terminals, they may also be set by the application of appropriate signals to the S or R terminals. Thus, for resetting flip-flop 32 before the conversion begins the reset input signal appearing on lead 30 is connected via diode 42 to the reset terminal R of flip-flop 32.

The circuit for the flip-flop 32 as so far described is identically repeated with the other flip-flops. Thus flip-flop 34 has associated with its S! and R! terminals, inhibit gates 44 and 46; diode 48 interconnects the R terminal of flip-flop 32 and lead 30. Similarly flip-flop 36 has inhibit gate 48 associated with its S! terminal and inhibit gate 50 associated with its R! terminal. Diode 52 interconnects lead 30 and the R terminal of flip-flop 36. Finally inhibit gate 54 is associated with the S! terminal flip-flop 38, inhibit gate 56 with its R! terminal and diode 58 supplies the signal to the R terminal of flip-flop 38 at the start of a conversion.

The converter of FIGURE 2 also includes a plurality of "OR" gates 60, 62, 64, 66 and 68. In the logical scheme of my invention these "OR" gates will provide a negative output voltage level if all the input leads are negative. If one or more leads are positive, the output level will be positive. As can be seen from FIGURE 2, "OR" gate 68 has two input leads, one from the reset terminal of flip-flop 38 and one from lead 70. Lead 70 is the lead which carries a signal indicative of the state of any subsequent flip-flops associated with the converter. If the signal on lead 70 is negative, this indicates that all subsequent flip-flops are in the rest state. If it is positive it indicates that one or more of the subsequent flip-flops are in the set state. The signal on lead 70 is supplied to all five of the "OR" gates shown in FIGURE 2.

The output of "OR" gate 68 is supplied as one input to inhibit gate 56 and also to a state indicator 71. This state indicator indicates the state of the conversion process as will be more fully explained hereinafter.

The inputs to the gates 62, 64 and 66 follow the same pattern as gate 68 i.e. one input is from the reset terminal of the flip-flop immediately preceding it in the sequence and another input is from lead 70. Additionally, an input is provided from the set terminal S of each following flip-flop in the sequence. For flip-flops not shown in FIGURE 2 this is provided by lead 70. For the flip-flops shown, individual leads are provided. Thus the set terminal of flip-flop 38 is connected to lead 72, the set terminal of flip-flop 36 to lead 74 and the set terminal of flip-flop 34 to lead 76. These leads in turn are connected to the "OR" gates associated with higher flip-flops in the sequence. Thus lead 72 supplies signals to gates 62, 64 and 66, lead 74 to gates 62 and 64 and lead 76 to gate 62.

Leads 70, 72, 74 and 76 as well as the set terminal S of flip-flop 32 are connected as inputs to "OR" gate 60. The output signal from this gate appearing on lead 70' corresponds to the signal appearing on lead 70 and is supplied to preceding flip-flops in the sequence, if any. If this signal is negative it indicates that the four flip-flops shown in FIGURE 2 as well as all subsequent flip-flops (if any) are in the reset state. If this signal is positive, it indicates that one or more of the flip-flops are positive. This occurs, of course, because of the fact that if any flip-flop is in the set state its set terminal S will be positive, and supply a positive input signal to gate 60. As explained above, one or more positive input signals to gate 60 will result in a positive output signal.

The output signal from "OR" gate 62, 64 or 66 is supplied as one input to the inhibit gate associated with the R! terminal of the flip-flop next preceding it in the sequence and to the inhibit gate associated with the S! terminal of the flip-flop next subsequent to it in the desired sequence. Thus, the output of "OR" gate 62 is supplied to inhibit gates 40 and 44, the output of "OR" gate 64 to inhibit gates 46 and 49 and the output of "OR" gate 66 to inhibit gates 50 and 54.

Gate 39 is not ordinarily supplied from the gate 60 but is instead supplied with a signal from preceding or higher states on lead 80. If this signal is positive, as it will be so long as the next preceding flip-flop is in the reset state, gate 39 will be closed. However, when the preceding flip-flop is set, as it is prior to having a digit stored in it, lead 80 will become negative. If flip-flop 32 is the first flip-flop in the converter, then a jumper, shown in FIGURE 2 as the lead 84 is connected between the output lead 70' and lead 80.

A signal corresponding to that supplied to flip-flop 32 on lead 80 from the next higher flip-flop is supplied on lead 82 to the next lower module from the R terminal of flip-flop 38. The output of each "OR" gate, when negative also may be used to operate an indicator or other circuitry to show the state of the converter. These indicators are shown diagrammatically at 86, 88, 90, and 92 as well as at 71 as previously described.

Each of the inhibit gates associated with the set pulse input terminal S! of the flip-flops i.e. gates 39, 44, 49 and 54 is supplied with clock pulses from the clock pulse input lead 13. Similarly each of the inhibit gates associated with the R! terminal of the flip-flops, i.e. gates 40, 46, 50 and 56 is supplied with the signal pulse train appearing on lead 15.

*Operation*

The sequence of operation of the converter shown in FIGURE 2 will now be described. It will be assumed for purposes of this discussion that the flip-flop 32 is the first flip-flop in the converter and that therefore the jumper 84 is in place.

The first step in the sequence of operation is the application of an appropriate signal on lead 30 which is applied through diodes 42, 48, 52 and 58 to the R terminal of each of the flip-flops shown and to all subsequent flip-flops in the converter. This clears the converter by setting all flip-flops to the reset state. All R terminals are then positive in polarity and all S terminals are negative. Thus the output of the "OR" gates 62, 64, 66 and 68 are positive and the signal appearing on lead 82 is positive. However, the output from "OR" gate 60 appearing on lead 70' is negative since all its inputs are from the S terminals of all the flip-flops of the converter. This negative polarity output signal is carried by the jumper 84 to the lead 80 and applied to inhibit gate 39 causing it to open. At the same time indicator 86 is activated.

The first clock pulse appearing on lead 13 is applied to all the inhibit gates associated with the set pulse input terminals S! of all the flip-flops in the converter. However, since only gate 39 is open, the others being closed by reason of the positive output signal from their associated "OR" gate, the first clock pulse is passed only to the pulse input terminal S! of flip-flop 32, causing it to assume the set state.

When flip-flop 32 assumes the set state, the output lead 14, associated with the set output terminal S becomes positive and the lead 16 connected to the R terminal of flip-flop 32 becomes negative. As a consequence, the output of "OR" gate 60 becomes positive thus closing gate 39. However, all inputs to "OR" gate 62 are now of a negative polarity, assuming that all lower flip-flops were properly reset. This negative output signal from gate 62 opens inhibit gates 40 and 44.

At the time of the next clock pulse, gate 44 will then be the only open inhibit gate associated with the set pulse input terminal S! of any of the flip-flops and thus the flip-flop 34 will assume the set state. If a pulse of the serial pulse train appears on the lead 15 at the same time as the second clock pulse, it will be passed by the open inhibit gate 40 to reset flip-flop 32 and cause a "1" to be stored in the flip-flop. If no pulse appears on the lead 15 at the time of the second clock pulse, flip-flop 32 remains in the set state, thus storing a "0."

The "OR" gate 62 will have a positive input when the flip-flop 34 changes state to the set state as a result of a clock pulse being passed by the gate 44 to the set pulse input terminal S!. This positive output signal will cause gate 44 to close so that subsequent clock pulses will not be passed by it.

The output of "OR" gate 62 may also become positive if a signal pulse resets flip-flop 32; if this takes place sufficiently in advance of the reception of the clock pulse so that gate 44 is closed before the clock pulse is received improper circuit operation would result. Similarly if the clock pulse leads the signal pulse in time by a sufficient amount, gate 40 might be closed before the signal pulse arrives. There is also a timing problem if the inhibit gates open too rapidly. Thus, if a clock pulse causes flip-flop 32 to assume the set state, and the output of "OR" gate 62 to become positive, thereby opening gate 44 in sufficiently rapid succession, the clock pulse may still be present and cause flip-flop 34 to be set, although this is not desired.

In practice, I have found that there is a sufficient delay between the time that the ouput of "OR" gate 62 changes polarity and the time that the gates 40 and 44 open or close in response to this changed polarity to accommodate a substantial difference in time of arrival of the clock and signal pulses and also to prevent double setting of the flip-flops. This delay occurs because the inhibit gates 34, 40, 44, 46, 49, 50, 54 and 56 are preferably of the so-called "energy storage" type. Inhibit gates of this type depend upon a capacitor charging to reverse bias a diode. Since it takes a finite time to charge or discharge the capacitor of the inhibit gates, they do not open or close immediately upon the output lead from "OR" gate 62 changing polarity but remain in their previous state for a substantial period following this event. Thus, the need for exact coincidence between clock pulses and the pulses forming the signal pulse train is obviated. It is apparent of course that the time constant of charge of the capacitor in the inhibit gate must be sufficiently short so that the gates will have reached their proper state by the time of arrival of the next clock pulse. In practice I have found that if the time constant of charge of the capacitor in the inhibit gates is approximately one third the period of the clock pulses, satisfactory operation is achieved while still permitting a reasonable lack of coincidence between clock and signal pulses.

Returning to the operation of the converter, once the flip-flop 34 has been set by a clock pulse, its reset terminal will become negative and the output of "OR" gate 64 will become negative, opening inhibit gates 46 and 49. The next clock pulse then sets flip-flop 36 after passing through gate 49 and if a signal pulse is present at about the same time it is passed by gate 46 to the reset pulse input terminal R! of flip-flop 34 to reset it and store a "1" therein. Again the absence of a pulse leaves flip-flop 34 in the set state, and the absence of a pulse is stored as a "0."

The operation continues in this fashion until the final flip-flop 38 of the series shown in "set" by the fourth clock pulse received. The reset terminal R and lead 28 go negative in this condition, thus causing the output of gate 68 to go negative. This opens inhibit gate 56 so a signal pulse can be passed to flip-flop 38 if a pulse is present on lead 15 at the time of the next clock pulse and also operates indicator 71.

The negative potential appearing on the reset terminal R is passed to the next subsequent flip-flop in the converter on lead 82. The signal passed by lead 82 would appear in the next subsequent group of flip-flops on the lead corresponding to lead 80. Of course, in this subsequent group the jumper 84 would not be present so that the signal supplied from flip-flop 38 would serve to open the inhibit gate associated with the pulse input terminal S! of that flip-flop.

It will be observed that in order for any flip-flop to receive signal pulses, it must be conditioned by being transferred from its initial reset state to the set state, since in each case the inhibit gate associated with the signal pulse input to that flip-flop is closed when the flip-flop is reset. It will also be observed that no flip-flop can be transferred from the reset to the set state by clock pulses unless:

(1) The flip-flop immediately preceding it is in the set state; and (2) All subsequent flip-flops in the set making up the converter are in the reset state.

If this last condition were not true, the output of the "OR" gates 60, 62, 64 and 66 would not go negative at the proper time since the gated set outputs of all lower or subsequent flip-flops are supplied to these gates.

As I have noted previously, the converter may include as many flip-flops as desired. In practice, I have found it desirable to interconnect modules each having four flip-flops in the configuration shown in FIGURE 2 to provide a complete converter. The first module in the series includes the jumper 84 as shown in FIGURE 2. Subsequent modules are connected so that lead 70' of the subsequent module joins lead 70 of the preceding module and lead 84 of the subsequent module is connected to lead 82 of the preceding module. This can be continued to include as many flip-flops as desirable. The output signal from the gate corresponding to gate 68 in FIGURE 2 may be used as a stop signal to indicate the end of conversion if desired.

While I have found it convenient to describe my invention in terms of a module with four flip-flops thereon, such construction is of course not necessary and the invention may be practiced without using the modular concept, as will be obvious to those skilled in the art. Also, while I have shown all of the reset terminals R of the flip-flops connected in common to the reset input lead, these might, for particular applications be connected to other separate sources of input signals, as may the set terminals to establish whatever initial conditions are appropriate for the circuit operation.

Although I have described my invention in terms of a serial to parallel converter for digital signals, the circuit of my invention has many other applications. For example it may be used as both the programmer and counter in an analog to digital converter of the feedback type. Analog to digital converters of the feedback type are described generally in U.S. Patent No. 3,052,880 issued September 4, 1962 to F. M. Young et al., and in the patents referred to therein. In general they include a summing junction to which is supplied the analog signal to be converted and a feedback signal, usually a current, representative of the number stored in the analog to digital converter. The summing junction output signal is supplied to a comparator, which supplies pulses to control logical circuitry to properly set the feedback signal so as to make the feedback signal approach as closely as possible the magnitude of the input analog signal.

In analog to digital converters using the converter of my invention the output signals of the converter flip-flops control a series of binary or decimally weighted current switches which in turn control the feedback current to the summing junction. Thus, the converter of my invention, in response to clock pulses generated internally by the analog to digital converters, operates each of the current switches sequentially, starting with the most significant unit or digit and continuing to the least significant. In other words, when a flip-flop of the serial to parallel converter is in the set condition a switch is operated to cause additional current to flow to the summing junction. After each switch is closed in response to a clock pulse, the comparator examines the summing junction. If the increment of current added by closing the switch is less than the current required to balance the input signal, no action takes place. This corresponds to a "0" or no pulse in the input signal pulse train. If, however, the current added by the switch is in excess of that required to balance the input signal, a reset pulse corresponding to a "1" in the signal pulse train is generated coincident with the next clock pulse and this resets the flip-flop, closing the switch which added the excessive current.

Thus the converter of my invention replaces a shift register and a group of counters in a conventional analog to digital converter, thus simplifying the construction and operation of these devices. Thus, while I have described my invention as a self-programmed serial to parallel converter, I do not thereby intend to restrict the scope of the claims included herein to that single application, but intend them to cover each use to which the circuit may be put.

It will thus be seen that I have provided a novel self-programmed serial to parallel converter which accepts a clock pulse train and a signal pulse train, and converts the signal pulse train to a series of concurrent or simultaneously appearing voltage levels. This is accomplished by implementing certain logical propositions directly from the flip-flops used to provide the outside signals rather than, as was done in the past, using a second set of flip-flops, a delay line or shift register to program the output flip-flops. There is thus a consequent saving in both cost and complexity as compared with prior devices of this nature. The reduction in complexity also increases the reliability of converters made according to my invention as compared to prior converters. Finally as has been discussed, converters made in accordance with my invention are readily adopted to modern modular construction.

It will thus be seen that the objects set forth above, among those made apparent from the preceding description are efficiently attained and, since certain changes may be made in the above construction without departing from the scope of the invention, it is intended that all matter contained in the above description or shown in the accompanying drawing shall be interpreted as illustrative and not in a limiting sense.

In particular, while I have described my invention using inhibit gates and "OR" gates as logical elements, it is to be understood that other elements might be used to implement the same logical function. For example the "OR" gates might be replaced by "AND" gates with the inputs to these "AND" gates taken from the opposite terminals of the flip-flops from these shown in FIGURE 2. The inhibit gates of FIGURE 2 would then become conventional "AND" gates. However, the "AND" gates corresponding to the inhibit gates in FIGURE 2 should include some delay in their operation for the reasons described above.

It is to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A serial to parallel converter for converting the pulses of a pulse train serially spaced in time to parallel form, the pulses of said pulse train being synchronized with a train of clock pulses, comprising, in combination, a plurality of flip-flops, each of said flip-flops having a pair of pulse input terminals and a pair of output terminals, logical input circuitry associated with said pulse input terminals, said logical input circuitry including for each flip-flop a pair of inhibit gates of the energy storage type having a plurality of input terminals and a single output terminal, means connecting the output terminal of a different first of said gates to a first input terminal of each of said flip-flops and means connecting the output terminal of a different second of said gates to a second input terminal of each of said flip-flops, a clock pulse input terminal, a digital signal input terminal, means connecting the clock pulse input terminal to one input terminal of each of the first of said inhibit gates, means connecting the digital signal input terminal to one input terminal of each of the second of said inhibit gates, means controlled by said flip-flops for controlling said first inhibit gates to open the first inhibit gate for each flip-flop when the flip-flop next preceding it in the sequence is operated from a first to a second state and all subsequent flip-flops in said sequence are in said first state, and means controlled by said flip-flop for controlling said second inhibit gates to open the second gate for each flip-flop when the flip-flop is in said second state and all subsequent flip-flops in said sequence are in said first state.

2. The combination defined in claim 1 which includes means for setting all of said flip-flops simultaneously to said first state.

3. The combination defined in claim 1 in which said means for controlling each of said first and second inhibit gates includes an "OR" gate.

4. A serial to parallel converter for converting the pulses of a serial pulse train in which the pulses are spaced in time into a parallel form in which the pulses appear as concurrent voltages on the output terminals of a plurality of flip-flops comprising, in combination, an ordered plurality of flip-flops, each of said flip-flops having a pair of input terminals and a pair of output terminals, a clock pulse input terminal, a first inhibit gate associated with each of said flip-flops, said inhibit gates each having an output terminal connected to a first input terminal of its associated flip-flop, means connecting clock pulses appearing at said terminal to a first input terminal of each of said first inhibit gates, whereby said flip-flops are operated in a predetermined fashion from a first to a second state by said clock pulses when the associated inhibit gate is conditioned to pass said clock pulses, a digital signal input terminal, a second inhibit gate associated with each of said flip-flops, the output terminal of each of said second gates being connected to a second input terminal of its associated flip-flop, means connecting the signal pulses appearing at said digital signal input terminal to an input terminal of each of said second inhibit gates whereby each of said flip-flops is returned from its second to its first state by one of said signal pulses when said second gate is conditioned for conduction, the operation of one of said flip-flops from the first to the second state conditioning the second inhibit gate of that flip-flop and the first inhibit gate of the following flip-flop whereby the following flip-flop may be operated from the first to the second state on receipt of the next clock pulse at the clock pulse input terminal, a flip-flop operated from the first to the second state by a clock pulse being returned to the first state only if a signal pulse is received at the digital signal input terminal substantially coincidental with the next clock pulse, the operation of a first flip-flop following a second flip-flop in said plurality of flip-flops removing the conditioning on the second inhibit gate associated with the second flip-flop and the first inhibit gate associated with the first flip-flop whereby the operation of a flip-flop from the first to the second state prepares the following flip-flop for a change in state on receipt of a clock pulse, prepares itself for a return to said first state on receipt of a signal pulse substantially coincident with the next clock pulse, and prevents both clock and signal pulses from affecting prior flip-flops.

5. A serial to parallel converter for converting the pulses of a pulse train serially spaced in time to parallel form, the pulses of said pulse train being synchronized with a train of clock pulses, comprising, in combination, an ordered plurality of flip-flops each settable to a first and a second state, a clock pulse input terminal, a digital signal input terminal, gating means controlled by said flip-flops and said clock pulse terminal for setting a first of said flip-flops to its first state in response to a clock pulse when the first flip-flop is in its second state and the other flip-flops are all in their second states, gating means controlled by said flip-flops and said digital signal input terminal for setting said first flip-flop to its second state in response to a digital signal when the first flip-flop is in its first state and the other flip-flops are all in their second states, gating means controlled by a last and the next preceding the last of said flip-flops and said clock pulse terminal for setting said last flip-flop to its first state in response to a clock pulse when the last flip-flop is in its second state and the next preceding flip-flop is in its first state, gating means controlled by the last of said flip-flops and said digital signal terminal for setting said last flip-flop to its second state in response to a digital signal when the last flip-flop is in its first state, gating means for each intermediate flip-flop controlled by that flip-flop, by the next preceding flip-flop, by said clock pulse terminal, and by all succeeding flip-flops, for setting each intermediate flip-flop to its first state when the intermediate flip-flop is in its second state, the next preceding flip-flop is in its first state, and all subsequent flip-flops are in their second states, gating means for each intermediate flip-flop controlled by that flip-flop, by the digital signal terminal, and by all succeeding flip-flops for setting each intermediate flip-flop to its second state in response to a digital signal pulse when the intermediate flip-flop is in its first state and all subsequent flip-flops are in their second states, and means for simultaneously setting said flip-flops to their second states to condition the apparatus for the receipt of a train of digital signal pulses.

6. The apparatus of claim 5, in which said gating means comprises gates of the energy-storage type.

References Cited

UNITED STATES PATENTS 3,160,876 12/1964 Stochel ------------ 340—347

DARYL W. COOK, *Acting Primary Examiner.*

K. R. STEVENS, *Assistant Examiner.*